A. K. Foster,
Sharpening Rotary Saws.
N°48,546.    Patented July 4, 1865.
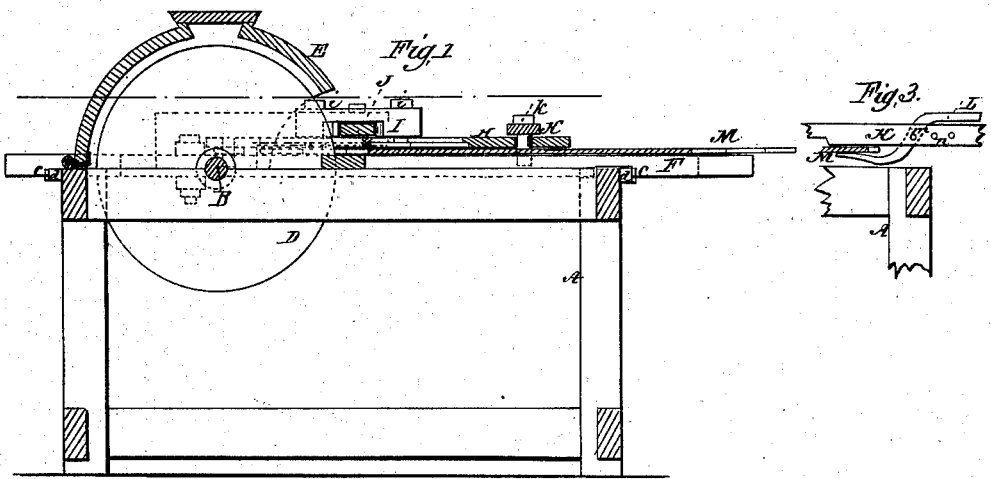
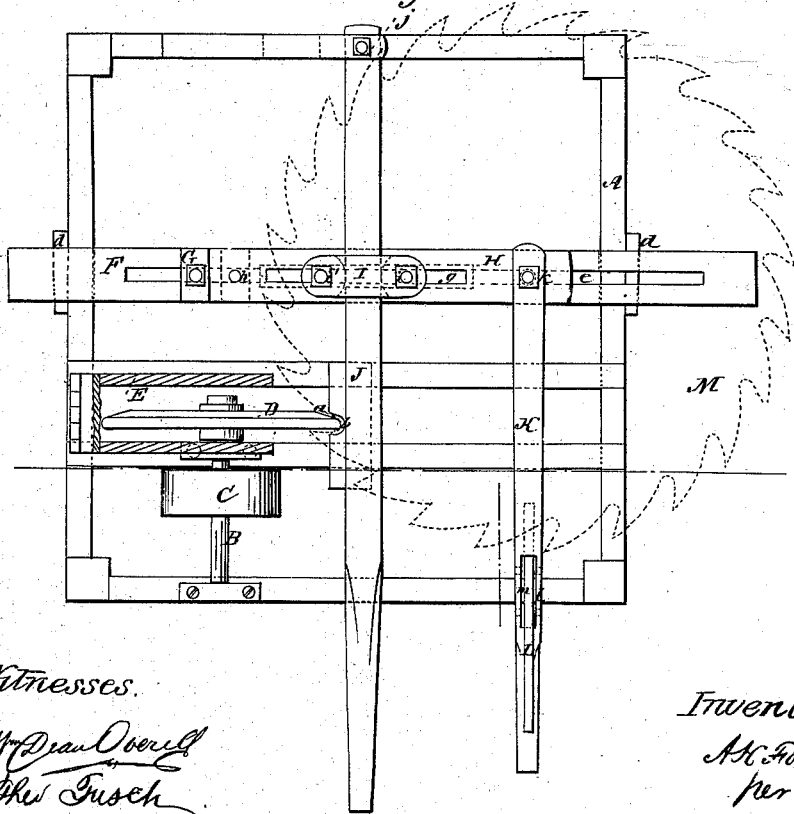
Witnesses.    Inventor.

UNITED STATES PATENT OFFICE.

A. K. FOSTER, OF HALLETTSVILLE, TEXAS.

IMPROVED SAW-GUMMER.

Specification forming part of Letters Patent No. 48,546, dated July 4, 1865.

*To all whom it may concern:*

Be it known that I, A. K. FOSTER, of Hallettsville, in the county of Lavaca and State of Texas, now temporarily residing in New Orleans, in the State of Louisiana, have invented a new and Improved Saw-Gumming Machine; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, a vertical section of a portion of the same, taken in the line $y\ y$, Fig. 2.

Similar letters of reference indicate corresponding parts in the several figures.

This invention relates to a new and improved saw-gumming machine of that class in which a grindstone is employed for performing the work.

The invention consists in using, in connection with a grindstone, an adjustable and a sliding bar and levers, one of which is provided with a jaw or clamp, and all the parts so arranged as to admit of the work being performed in an expeditious and perfect manner.

To enable those skilled in the art to fully understand and construct my invention, I will proceed to describe it.

A represents the frame of the machine, which may be constructed in any proper manner to support the working parts.

B is a mandrel or arbor placed on the upper part of the frame A, and having upon it a driving-pulley, C, and a grindstone, D, both of which are shown in Fig. 2. The face of the grindstone is made of beveled form, as shown at $a$, and rounded at its outer edge, as shown at $b$, and a cap, E, is placed over its top to prevent the water used in the operation being thrown by the grindstone upon the attendant.

F represents a bar, which is placed upon the top of the frame A, and has a longitudinal recess made in its under side, so as to form a shoulder, $c$, near each end of it, between which shoulders and the sides of the frame A wedges $d$ are interposed to secure the bar F in the desired position. This bar F has a slot, $e$, made in it, which extends nearly its whole length, and to said bar there is secured, by a set-screw, $f$, a stop, G. (Shown in Fig. 2.)

H is a bar, which also has a slot, $g$, made in it, extending nearly its whole length. This bar H is placed upon the bar F, and the former is provided with a pendent pin, $h$, at one end, which projects down through the slot $e$ of bar F. On the bar H there is secured by set-screws $i\ i$ a notched block, I, and J is a lever, which passes through the block I and has its fulcrum-pin $j$ passing into the upper part of the framing, as shown in Fig. 2.

K is a lever, the fulcrum-pin $k$ of which passes through the bar H at the end opposite to that where the pin $h$ is attached. This fulcrum-pin $k$ passes through the slot $g$ of bar H, and also through the slot $e$ of bar F. The lever K has an oblong slot, $l$, made longitudinally in it, to admit of a curved lever, L, passing through it, said lever working on a fulcrum-pin, $m$, which passes horizontally through any of a series of holes, $n$, in lever K. (See Fig. 3.) This lever L performs the office of a jaw or clamp, as hereinafter explained.

M is a circular saw, which is fitted on the fulcrum-pin $k$, underneath the bar H, said saw resting on the bar F, the inner end of the jaw or clamp L being underneath the saw M.

The operation is as follows: The bar F is adjusted to suit the size of the saw M and the angle of the teeth required. Suppose, for instance, a saw be forty-eight inches in diameter, and it is desired to have its teeth range twelve inches from the center, the bar F is so adjusted that its slot $e$ will be twelve inches from the front side of the grindstone. The several parts are then adjusted together, or placed as previously described, the teeth of the saw pointing toward the grindstone. The operator or attendant stands facing the grindstone, with his left hand resting upon lever J and his left hip gently pressing said lever toward the grindstone, while his right hand grasps the lever K and the jaw or clamp L, and through the medium of which the saw M is rotated, and by relieving the jaw or clamp L of pressure the lever K can be moved forward or backward without moving or rotating the saw. The grindstone is rotated with high velocity, and the saw M is brought up to it by actuating the lever J, a stream of water being allowed to pass upon the grindstone at its point of contact with the saw.

It is important that the grindstone be not allowed to act with both sides at once upon the saw, as that would cause the grindstone to run heavily and subject it to great wear and materially retard its work. The grindstone commences its work at the point of the tooth at the back of the same, and by means of the levers J and K the saw is presented to the grindstone and a "kerf" is made in the saw three-sixteenths or one-fourth of an inch, said kerf extending to the bottom of the tooth. This operation is repeated until the back of the tooth is of the desired shape. The stop G on the bar F determines the depth of the cut of the grindstone, and the saw has the proper feed movement given it by rotating it through the medium of the lever K and the clamp or jaw L, while pressing it forward toward the grindstone through the medium of lever J. When the back of the tooth is finished the front of the succeeding tooth is brought in exact range with the front side of the grindstone, the saw M being prevented from rotating by clamping it firmly with lever K and the clamp or jaw L, and the lever J is then pressed toward the grindstone until the sliding bar H comes in contact with the stop G, which may be adjusted from time to time to compensate for the wear of the stone.

The advantages of this invention consist in its cheapness and simplicity, capable of being used without the liability of injuring the saw, the latter being under the complete control of the operator.

Having thus described my invention, what I claim as new, and desire to secure by Letters Patent, is—

The grindstone D, with the adjustable bar F, sliding bar H, and with the levers J K and clamp or jaw L, or their equivalents, all arranged, in connection with the saw M, to operate substantially in the manner as and for the purpose herein set forth.

A. K. FOSTER.

Witnesses:
 M. W. WHEELER,
 D. S. CARNDHAN.